Aug. 31, 1926.
C. A. HOXIE
1,598,377
RECORDING SOUND
Filed May 20, 1921
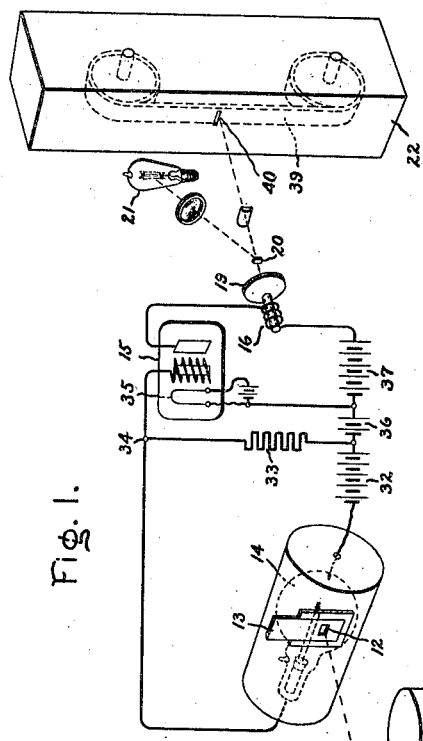
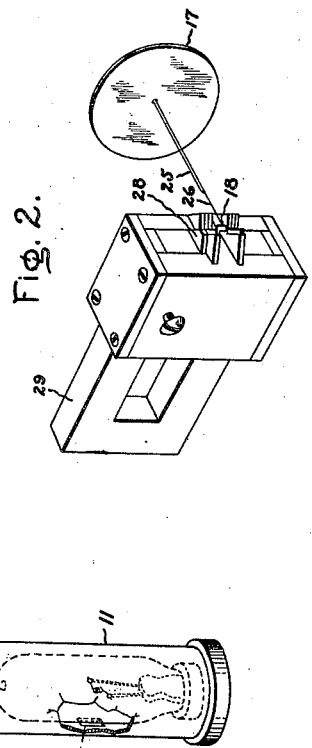
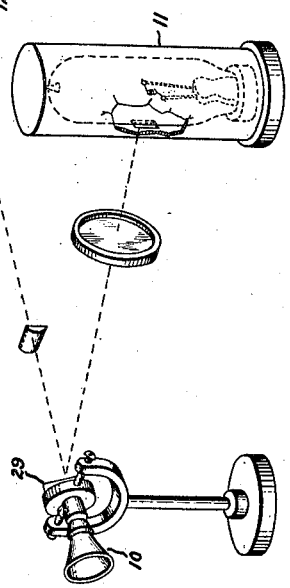
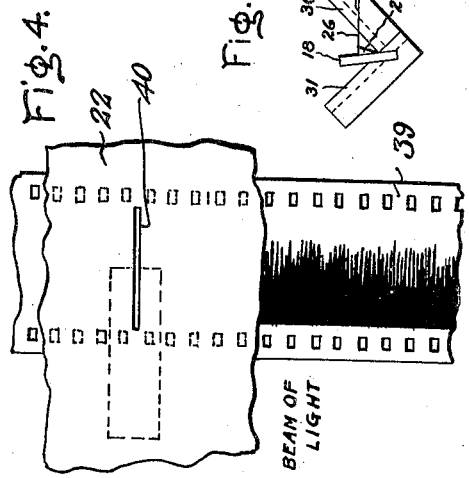
Inventor:
Charles A. Hoxie,
by Albert G. Davis
His Attorney.

Patented Aug. 31, 1926.

1,598,377

UNITED STATES PATENT OFFICE.

CHARLES A. HOXIE, OF SCHENECTADY, NEW YORK, ASSIGNOR TO GENERAL ELECTRIC COMPANY, A CORPORATION OF NEW YORK.

RECORDING SOUND.

Application filed May 20, 1921. Serial No. 471,229.

This invention relates to the recording of sounds and particularly to a method and apparatus whereby complex sound, such as that of the human voice or of instrumental music, may be recorded without distortion.

According to the preferred embodiment of my invention I form a record of the sound wave upon a moving photographic film by causing a small beam of light to which said film is exposed to vibrate in a manner corresponding to the sound vibrations. This beam before reaching the film is partially intercepted in such a way that as the beam vibrates, portions of the film of varying width are exposed to the light.

I am aware that various attempts have been made to record sounds photographically by means of light rays which are received by some device sensitive thereto, but so far as I am aware they have all failed to accomplish the results sought because the various means employed have not been sufficiently responsive to the impressions received, with the actual result that the waves produced have been greatly distorted.

The apparatus which I employ is simple in construction, easy to manipulate, and thoroughly reliable in operation.

Other objects and advantages will appear from the following description taken in connection with the accompanying drawing, wherein Figure 1 is a diagrammatic view of an aparatus and connections thereto for making sound records in acordance with my invention; Fig. 2 is a perspective view of the sound receiving diaphragm and the mirror connected therewith; Fig. 3 is an enlarged detail view of the diaphragm and mirror showing in particular the mounting of the shaft which carries the mirror; Fig. 4 is a fragmentary view of the casing containing the film together with a portion of the film bearing a sound record.

As is shown in Figs. 1, 2 and 3, a transmitter 10 is provided with a diaphragm 17 to which is secured a mirror 18. Light from a suitable source 11 is reflected from the mirror and passes through a slit 12 formed in the screen 13 into the photo-electric cell 14. This cell is connected in the grid circuit of a thermionic vacuum tube amplifier 15. Amplifier 15 is provided with a plate circuit within which is included the coil 16 which serves as an actuating means of the diaphragm 19. Mirror 20 secured to the diaphragm 19 serves to reflect light from the source 21 into the casing 22. Casing 22 contains the moving film 39 upon which a photographic record is to be made.

Referring now more particularly to the elements shown diagrammatically in Fig. 1, the diaphragm 17 and mirror 18 are connected as shown in Figs. 2 and 3 by means of rods 25 and 26, the rod 26 being made thin at its outer end so as to be flexible. Mirror 18 is mounted on the triangular shaft 27 held in bearings 28 by means of a permanent magnet 29. The bearing surfaces are each formed of two jewels 30 and 31. Vibration of the diaphragm 17 results in the tilting of the shaft 27 and consequently tipping of the mirror 18. The mounting of the mirror and shaft is described and claimed in my Patent 1,456,595, May 29, 1923.

The photo-electric cell which I employ preferably comprises a sealed tube having a central anode and a cathode which consists of a coating of silver which has been formed on the wall of the tube and upon which has been deposited metallic potassium. Before final sealing, the tube is subjected to a Geissler discharge in an atmosphere of hydrogen. An opening is left in the cathode covered by the screen 13 to provide a window for the passage of the light which falls upon the interior surface of the cathode.

This cell may be conveniently made by exhausting the tubes and evaporating within the same a quantity of metallic potassium which is condensed upon the external walls, a suitable barrier being provided to prevent its condensation over the surface which it is designed to preserve as a window. 100 microns of hydrogen are then admitted to the tube and the light sensitive potassium cathode is "formed" by connecting the tube in series with a resistance of about 10,000 ohms to a 500 volt source of potential which will pass about 33 milliamperes through the tube in the form of a bluish discharge. In this operation the potassium constitutes the cathode. The result produced is an increase in the sensitiveness of the tube. If desired, the sensitiveness may be still further increased by introducing new hydrogen and again submitting the tube to discharge. Finally the hydrogen is removed and argon gas is admitted, the pressure of this varying according to working conditions from 12 to 200 microns. The lower pressures are used with higher impressed potentials to give the tube a greater stability. Such a tube may conveniently be operated at potential differences of between 50 and 500 volts. If desired to increase the sensitivity, more argon may be admitted. When this cell is placed in series with a suitable source of potential the current therethrough is dependent upon the quantity of light entering the cell or the area of cathode illuminated. It appears that the action of light has the effect of increasing a discharge from the cathode to the anode. While I have shown and described one form of photo-electric cell, it is clear that other forms may be used. I intend that the term "photo-electric cell" or "photo-electric device" shall apply to any means of this type through which current is adapted to flow and which has the property that the current flowing therethrough varies in response to any change in the quantity or area of illumination to which the cell is subjected regardless of any heat that may accompany the light and regardless of the rate of change of illumination. In operation the slit 12 in the screen 13 is arranged to permit but a portion of the beam of light from the mirror 18 to enter the photo-electric cell, the edge of the beam crossing the slit 12 in such a way that vibration of the mirror in response to the movements of the diaphragm permits a greater or less quantity of light to fall within the cell.

The circuit through the cell 14 includes a battery 32 and a noninductive resistance 33, this circuit being in electrical connection with the grid or control element of the thermionic vacuum tube device 15 from a point 34 intermediate the resistance 33 and anode of the cell 14. The filament 35 is connected to the opposite end of the resistance preferably through a few battery cells 36 to maintain a proper difference of potential between the filament and grid. In certain cases the potential across the grid and the filament is such as to make the use of these battery cells unnecessary. Included in the plate circuit of the amplifier is a source of current 37 and the coil 16 for actuating the diaphragm 19. Diaphragm 19 and its actuating coil are preferably constructed with as little self-inductance as possible and the diaphragm is of very light mass so that distortion of the wave form due to inertia of the mechanical parts shall be reduced to a minimum. The mounting of the mirror 20 and its actuating connection are substantially the same as the mounting and actuating connection of the mirror 18 as shown in Figs. 2 and 3. The casing 22 which is adapted to contain the moving photographic film 39 is provided with a slit 40 located directly in front of the film 39. Light from the source 21 is reflected from the mirror 20 in such a manner that the beam falls upon the slit, one edge of the beam crossing the slit. The position of the beam relative to the slit is shown in dotted lines in Fig. 4. It will be seen that upon vibration of the mirror this beam will be caused to vibrate and will produce a variation in the quantity of the light which passes through the slit 40. This light falls upon the film which is being moved behind the slit at a constant speed and produced upon the film an exposed band of varying width as is indicated in Fig. 4.

In practice, therefore, when sound waves fall upon the diaphragm 17 it is caused to vibrate and these vibrations are communicated to mirror 18. The diaphragm and mirror are constructed and mounted in such a manner that their movements are in strict accordance with the sound waves impressed upon the diaphragm. In order to accomplish this I construct the moving parts of extremely light mass. The diaphragm is however constructed to have but a small amplitude of vibration so as to reduce as much as possible stresses set up in the material of the diaphragm which would cause distortion of the wave form. Movement of the mirror 18 causes the beam of light from the source 11 to vibrate and by reason of its partial interception by the screen 13 causes a varying area of the cathode surface within the cell to be illuminated, with the result that slight changes are produced in the current flowing through the cell which correspond strictly to the vibrations of the light beam. In this connection it is to be noted that the only operative connection between the sound receiving means and the device 14 is the beam of light which having no inertia does not tend to cause distortion of the initial wave form. This means of varying a current in response to sound impulses received by a diaphragm has been found superior to such means as involve merely a mechanical connection between the diaphragm and current varying device, such for example as a microphone transmitter, in that the current changes produced in the former are particularly free from the effects of incidental vibrations caused by jars to the instrument or its support. The small variations in current through the photo-electric cell are amplified without distortion by means of the thermionic vacuum tube device. While I have shown a pliotron as an amplifying means, it is obvious that other means may be employed, such for example as a dynatron. The amplified current is caused to produce vibrations of the diaphragm 19 and mirror 20 which are of greater amplitude than the vibrations of the mirror 18.

This in turn causes vibrations of the beam of light from the source 21 which produces the variation in the exposure of the film.

For accurate reproduction I have found it advisable to use a film which has a very fine texture in order that the effects of the light shall be localized to the actual area illuminated. While I have shown in Fig. 4 a film which has but a single record thereon it is obvious that several such records may be made side by side on a single film. It is also clear that the record may be made on a photographic plate in the form of a disc which rotates behind the slit 40. I prefer, however, to employ a film because it can be formed into a roll which occupies a relatively small space.

In actual practice it will be customary to make a master film or negative by means of the apparatus shown in Fig. 1 and from this a considerable number of positives may be made for use with the reproducing devices. While I have shown in Fig. 1 means whereby the vibrations of the transmitting diaphragm 17 may be amplified by means of a photo-electric cell and a thermionic vacuum tube amplifier, in certain cases it is feasible to allow light from the mirror 18 to fall directly upon the slit 40 in the casing 22 thereby avoiding the necessity of the use of the photo-electric cell and amplifier.

What I claim as new and desire to secure by Letters Patent of the United States, is:—

1. In a device for recording sound waves, a combination with a diaphragm adapted to receive the sound waves which it is desired to record, of means cooperating therewith for causing a beam of light to vibrate in a manner corresponding strictly to the sound waves falling upon said diaphragm, means adapted to receive said beam of light and to produce in response to the vibrations thereof variations in current corresponding strictly to said vibrations, means whereby said variations in current may be amplified without distortion and means responsive to said amplified current for causing a second beam of light to vibrate in a manner corresponding strictly to the variations in amplified current, the vibrations of said second beam of light being of greater amplitude than the vibrations of said first mentioned beam of light and means for recording the vibrations of said second beam of light.

2. A method of producing a sound record which consists in producing vibrations of a beam of light corresponding to the sound which it is desired to record, causing the vibrating beam to produce changes of current corresponding to said vibrations, amplifying said changes in current without distortion, causing the current so amplified to produce vibrations of a second beam of light, said latter vibrations being of greater amplitude than said first named vibrations and causing said latter vibrations to produce variations in the exposure of a moving photographically sensitized surface.

3. In a device for producing a photographic record of sound, a source of light, means for producing a beam of light from said source and causing said beam to vibrate in a manner corresponding to the sound which it is desired to record, a vacuum tube amplifier having plate and control circuits, a source of current, a photo-electric cell connected to said control circuit and in series with said source of current, said photo-electric cell being adapted to receive light from said source, means for causing the vibrations of said beam of light to produce changes in the light received by said cell, a diaphragm, means connected in said plate circuit for actuating said diaphragm, a mirror flexibly connected to said diaphragm and movable therewith, a source of light for said mirror, a cabinet, a photographic film movable within said cabinet and adapted to be exposed to light from said mirror, and means interposed between said mirror and film whereby vibrations of said mirror will cause variations in the exposed area of said film.

4. A means for producing a photographic record of sound which comprises a diaphragm of light mass mounted to vibrate through a small amplitude, a pivotally mounted mirror of light mass flexibly connected to said diaphragm and movable therewith, a source of light, a vacuum tube amplifier having non-reactive control and plate circuits, a photo-electric device connected to said control circuit and adapted to receive light from said source reflected from said mirror, means interposed between said mirror and device for causing vibrations of said mirror to produce corresponding changes in the light falling upon said photo-electric device, a second diaphragm, non-reactive means included in said plate circuit for actuating said second diaphragm, a second mirror flexibly connected to said second diaphragm and movable therewith, a second source of light, a cabinet, a photographic film movable within said cabinet and adapted to be exposed to light from said second source reflected from said second mirror, and means interposed between said second mirror and film whereby vibrations of said second mirror will cause variations in the exposure of said film.

5. A method of amplifying waves and components of different frequencies and recording the waves so amplified which consists in producing slight vibrations of a beam of light corresponding to the waves which it is desired to amplify and causing said vibrations to produce variations in the illumination of the cathode of a vacuum discharge device whereby changes of current are produced which correspond strictly to the vibrations of the beam of light, amplifying the changes in current without distortion, causing the current so amplified to produce vibrations of a second beam of light corresponding strictly to the amplified changes in current causing the vibrations of said second beam of light to produce variations in the exposure of a moving photographic sheet.

6. In a device of the character described, the combination of a light sensitive strip, means for moving the strip longitudinally, a shield in front of the strip having a narrow opening therein extending transversely of the strip, a sound actuated diaphragm, a source of light, a rock shaft connected to the diaphragm to be oscillated thereby, and a mirror carried by the rock shaft for directing a beam of light from said source on said screen and for causing the beam to vibrate in the direction of and over a portion of the opening therein in response to vibrations of the diaphragm, said diaphragm, rock shaft and mirror being of such small mass that inertia effects thereof within the audible range of frequencies are negligible.

In witness whereof, I have hereunto set my hand this 18th day of May, 1921.

CHARLES A. HOXIE